US007966382B2

(12) United States Patent
Ahluwalia et al.

(10) Patent No.: US 7,966,382 B2
(45) Date of Patent: Jun. 21, 2011

(54) ENABLING ACCESS TO MEDIA CONTENT IN MEDIA SERVERS IN REMOTE NETWORKS

(75) Inventors: Devinder S. Ahluwalia, Hillsboro, OR (US); Sandip H. Mandera, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1463 days.

(21) Appl. No.: 11/026,864

(22) Filed: Dec. 29, 2004

(65) Prior Publication Data

US 2006/0168219 A1 Jul. 27, 2006

(51) Int. Cl.
*H04L 12/28* (2006.01)
*G06F 15/16* (2006.01)

(52) U.S. Cl. ......... 709/218; 709/229; 709/230; 370/401

(58) Field of Classification Search .......... 709/217–219, 709/223, 229; 370/401
See application file for complete search history.

(56) References Cited

U.S. PATENT DOCUMENTS

| | | | | |
|---|---|---|---|---|
| 5,889,958 A * | 3/1999 | Willens | ......................... | 709/229 |
| 5,915,096 A * | 6/1999 | Rosenzweig et al. | ......... | 709/227 |
| 6,366,907 B1 | 4/2002 | Fanning et al. | | |
| 7,219,153 B1 * | 5/2007 | Day | ............................. | 709/229 |
| 7,454,511 B2 * | 11/2008 | Weast | ........................... | 709/231 |
| 2001/0033554 A1 * | 10/2001 | Ayyagari et al. | .............. | 370/328 |
| 2002/0087887 A1 * | 7/2002 | Busam et al. | ................ | 713/201 |
| 2005/0138137 A1 * | 6/2005 | Encarnacion et al. | ........ | 709/217 |

OTHER PUBLICATIONS

Richard, G.G., III, "Service advertisement and discovery: enabling universal devicecooperation", Internet Computing, IEEE; Sep./Oct. 2000; vol. 4, Issue: 5, pp. 18-26 [retrieved on Jan. 1, 2010 from IEEE database].*

Kangas, M., "Authentication and Authorization in Universal Plug and Play Home Networks"; Helsiniki University of technology.[retrieved on Jan. 1, 2010 from Internet=" http://www.tml.tkk.fi/Studies/T-110.557/2002/papers/mauri_kangas.pdf"].*

Olga Ratsimor, Dipanjan Chakraborty, Anupam Joshi, Timothy Finin, "Allia: alliance-based service discovery for ad-hoc environments", Proceedings of the 2nd international workshop on Mobile commerce, Sep. 28-28, 2002, Atlanta, Georgia, USA [retrieved from ACM database on Jun. 28, 2010].*

Mengotti, T. "GPU, a framework for distributed computing over Gnutella," Master Thesis dated Mar. 29, 2004; 52 pp.

Universal Plug-and-play, Wikipedia; http://en.wikipedia.org/wiki/UPNP; Dec. 15, 2004; 3 pp. Intel "Overview of UpnP AV Architecture, v. 1.0," http://developer.intel.com, c. 2003 Intel Corporation; Jul. 2, 2003; 10 pp.

Ritchie, et al. "UpnP AV Architecture: 0.83, Preliminary Design," Jun. 12, 2002;22 pp.

UpnP Forum "UpnP Device Architecture 1.0, v. 1.0.1," Dec. 2, 2003; 73 pp.

* cited by examiner

*Primary Examiner* — Joseph Thomas
*Assistant Examiner* — Lashanya R Nash
(74) *Attorney, Agent, or Firm* — Konrad Raynes & Victor LLP; David W. Victor

(57) ABSTRACT

Provided are a method, system, and program enabling access to media content in media servers in remote networks. Available devices are discovered in a network capable of being controlled, wherein the devices include at least one media renderer and media servers. An access list is maintained indicating network addresses of a subset of the discovered media servers available in the network. A determination is made of discovered media servers having network addresses indicated in the access list and the media content in the determined media servers is discovered. Indication of the discovered media content from multiple media servers is made in an aggregate content directory of media content. Discovered media renderers are enabled to access media content indicated in the aggregate content directory.

26 Claims, 5 Drawing Sheets

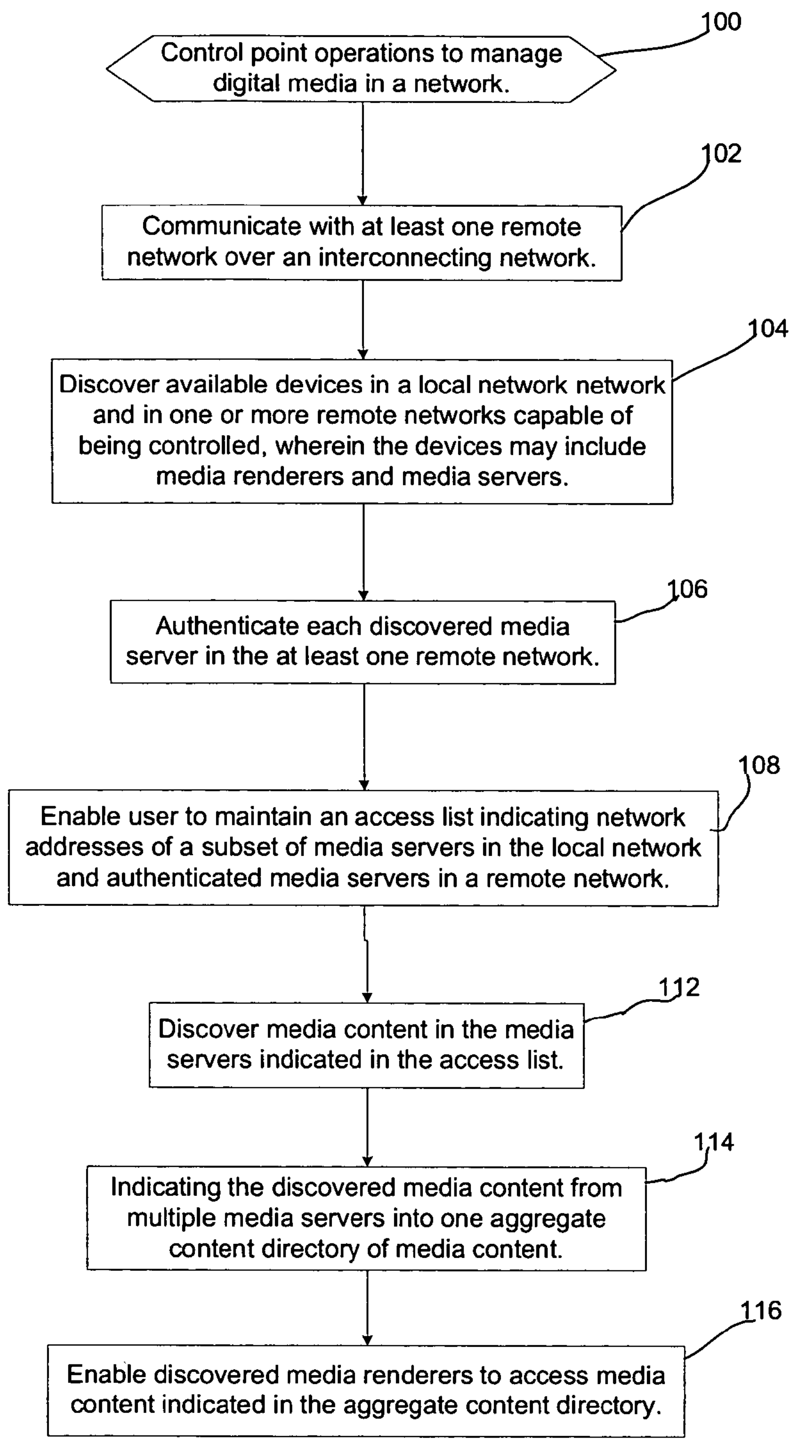
FIG. 5
100
Control point operations to manage digital media in a network.
102
Communicate with at least one remote network over an interconnecting network.
104
Discover available devices in a local network network and in one or more remote networks capable of being controlled, wherein the devices may include media renderers and media servers.
106
Authenticate each discovered media server in the at least one remote network.
108
Enable user to maintain an access list indicating network addresses of a subset of media servers in the local network and authenticated media servers in a remote network.
112
Discover media content in the media servers indicated in the access list.
114
Indicating the discovered media content from multiple media servers into one aggregate content directory of media content.
116
Enable discovered media renderers to access media content indicated in the aggregate content directory.

ENABLING ACCESS TO MEDIA CONTENT IN MEDIA SERVERS IN REMOTE NETWORKS

BACKGROUND

Home entertainment systems often maintain media content in different digital devices, such as personal computers, video and audio recorders, digital broadcast receivers, satellite receivers, CD/DVD players, camcorders, digital still cameras, audio players, etc. Media distribution technologies, such as the Universal Plug and Play (UPnP) Audio/Visual (AV) architecture, allow a rendering device to access media content in different devices, known as media servers, in the home network. Further details of the UPnP architecture are described in the publication "Overview of UPnP AV Architecture: A Digital Media Distribution Technology for the Home", ver. 1.00 (Copyright Intel Corp., 2003). The devices that participate in the sharing of media content, such as media servers having content and media renderers capable of presenting and rendering such content, may implement the UPnP protocol or other known protocols for sharing content. A user may access a control point, which browses a content directory indicating available media content in media servers in the local network, and select media content to transfer from one media server to one media renderer in the home network. The control point performs operations such as discovering devices in the home network and enabling a user to transfer media content from one discovered device to another.

BRIEF DESCRIPTION OF THE DRAWINGS

FIGS. 5, 6, and 7 illustrates operations performed by a control point to transfer media content.

DETAILED DESCRIPTION

Figure 1:
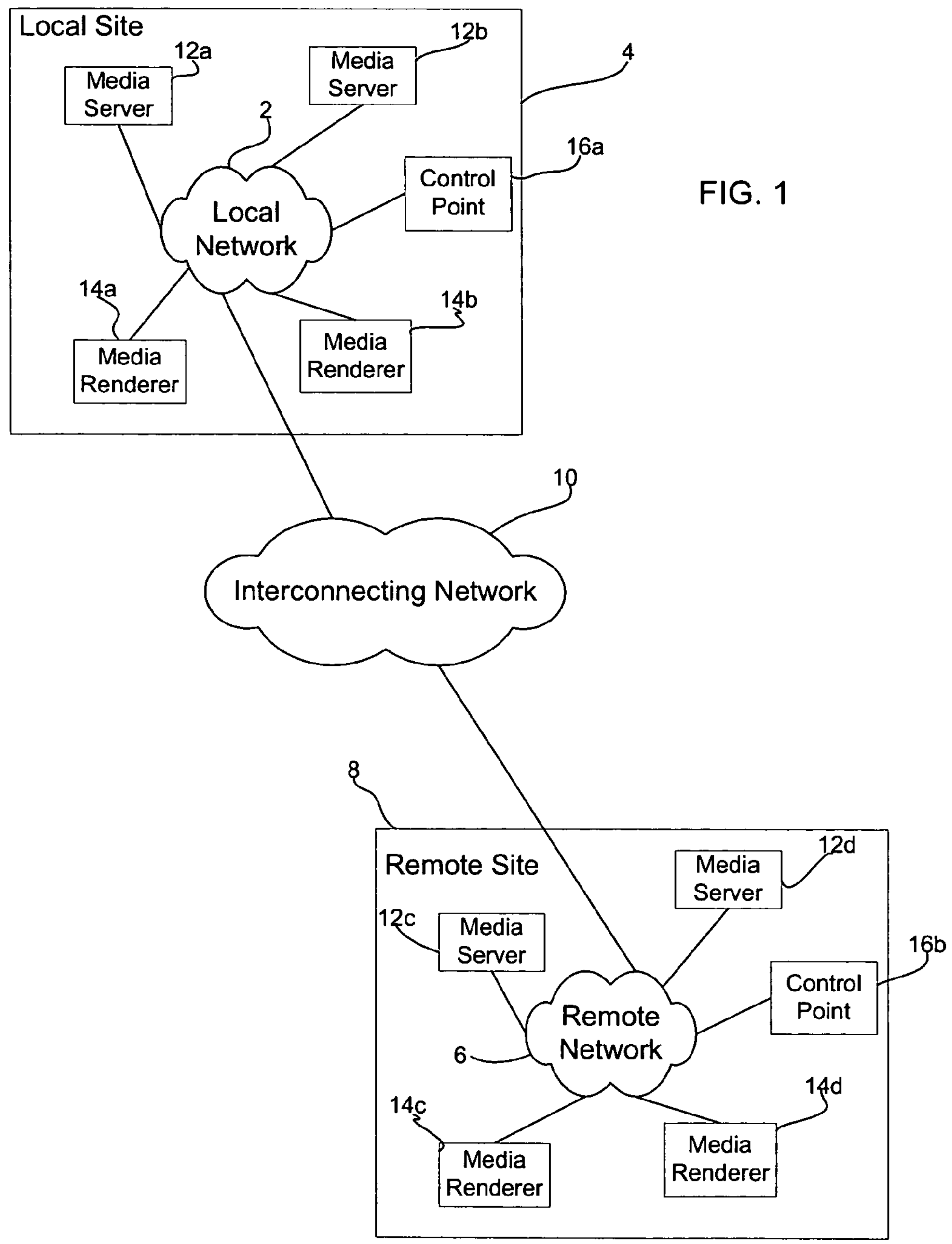
FIG. 1 illustrates an embodiment of a computing environment.

FIG. 1 illustrates a digital media environment having two networks, referred to as a local network 2 at a local site 4 and a remote network 6 at a remote site 8, that connect over an interconnecting network 10. For instance, the local 2 and remote 6 networks may comprise Local Area Networks (LAN) and the interconnecting network may comprise a Wide Area Network (WAN). The sites 4 and 8 may comprise homes, businesses, etc. Each network 2 and 6 includes media servers 12*a*, 12*b*, 12*c*, 12*d*, media renderers 14*a*, 14*b*, 14*c*, 14*d*, and control points 16*a*, 16*b*. The networks 2, 6 may have one or more media servers and media renders, and multiple control points. The control points 16*a*, 16*b* are capable of discovering devices, such as media servers 12*a*, 12*b*, 12*c*, 12*d* and media renderers 14*a*, 14*b*, 14*c*, 14*d* in the networks 6, 8, 10.

The media servers 12*a*, 12*b*, 12*c*, 12*d* have access to media content, such as videos, audio content, still images, etc., and can send the media content to another device for rendering, such as the media renderers 14*a*, 14*b*, 14*c*, 14*d*. Examples of media servers include VCRs, set-top boxes (including cable, satellite, and digital broadcast receivers), camcorders, CD/DVD players, radio tuners, television tuners, still-image cameras, etc.

The media renderers 14*a*, 14*b*, 14*c*, 14*d* comprise devices that are capable of receiving content from another device, such as the media servers 12*a*, 12*b*, 12*c*, 12*d*, and render the content using hardware. Examples of media renderers include televisions, stereo systems, speaker sets, an electronic picture frame (EPF), a personal computer, etc. Other examples include devices that produce output that is in a different media format than the format of the incoming content, such as a music fountain that generates dancing streams of water based on the content of a song.

The control points 16*a*, 16*b* are capable of controlling the media servers 12*a*, 12*b*, 12*c*, 12*d* and media renderers 14*a*, 14*b*, 14*c*, 14*d* to enable the media renderers 14*a*, 14*b*, 14*c*, 14*d* to render content from the media servers 12*a*, 12*b*, 12*c*, 12*d*. The control points 6, 8 may configure the renderers and servers and initiate the transfer of the content the user wants and control the content flow. The control points 16*a*, 16*b* may be accessible through a user interface. FIG. 1 shows the view of the networks from the perspective of control point 16*a*, where network 2 is a local network and network 6 is remote. However, from the perspective of control point 16*b*, network 6 is local and network 2 is remote.

Figure 2:
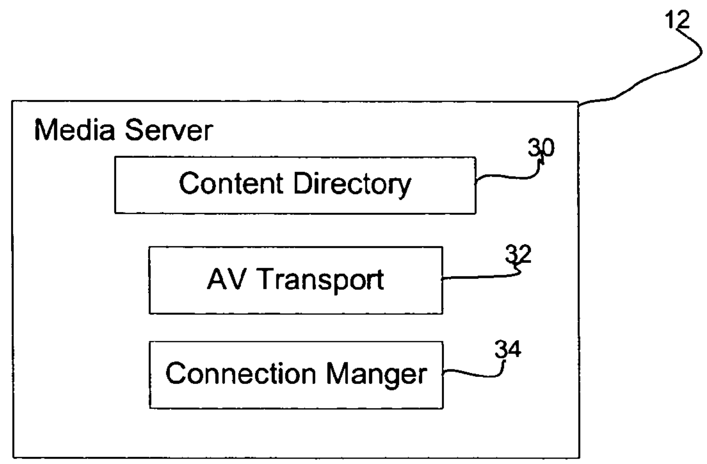
FIG. 2 illustrates components of a media server as known in the prior art.

In one embodiment, the control points 16*a*, 16*b*, media servers 12*a*, 12*b*, 12*c*, 12*d*, and media renderers 14*a*, 14*b*, 14*c*, 14*d* may implement the Universal Plug and Play (UPnP) protocol, described in "UPnP Device Architecture, Version 1.0.1.2" (UPNP Forum, December 2003) or other suitable protocols known in the art. FIG. 2 illustrates a prior art implementation of a media server 12 having components to implement the UPnP protocol, including: a content directory 30 enumerating all the content accessible through the server; an audio/visual (AV) transport service 32 that allows the control points 16*a*. 16*b* to identify the content to be played and control the flow of content, including end-user operations such as play, stop, pause, etc.; and a connection manager 34 comprising a service that allows the control points 16*a*, 16*b* to negotiate and select the transfer protocol and data format used by the media server and media renderer to transfer the content. The media servers 12*a*, 12*b*, 12*c*, 12*d* may be implemented as the media server 12.

Figure 3:
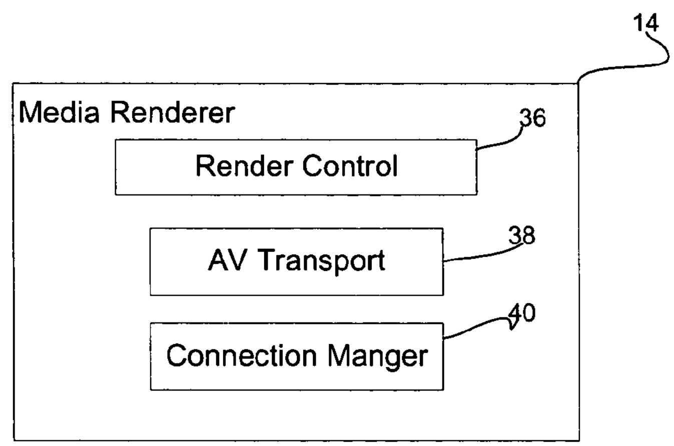
FIG. 3 illustrates components of a media renderer as known in the prior art.

FIG. 3 illustrates a prior art embodiment of a media renderer 14 having components to implement the UPnP protocol, including: a render control service 36 to provide the control points 16*a*, 16*b* with a mechanism to control how the content is rendered, such as volume, brightness, contrast, etc.; an AV transport service 38 that allows the control points 16*a*, 16*b* to identify the content to be played and control the flow of content, including end-user operations such as play, stop, pause, etc.; and a connection manager 40 comprising a service that allows the control points 16*a*, 16*b* to negotiate and select the transfer protocol and data format used by the media server and media renderer to transfer the content. The media renderers 14*a*, 14*b*, 14*c*, 14*d* may be implemented as the media renderer 14.

Figure 4:
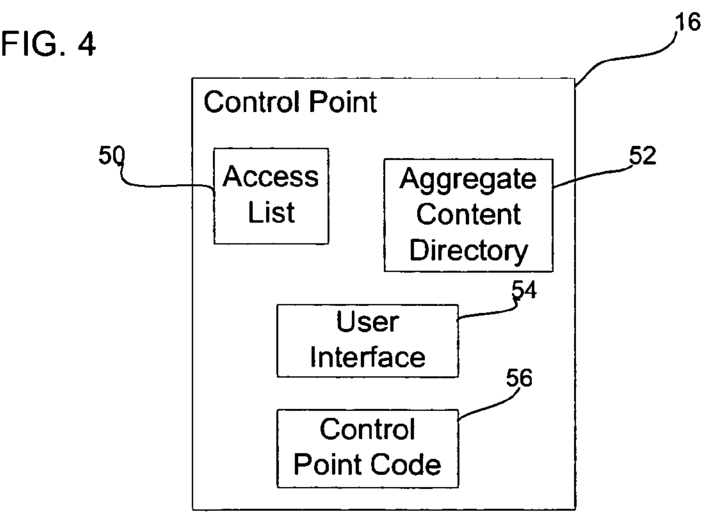
FIG. 4 illustrates an embodiment of a control point.

The control points 16*a*, 16*b* may be implemented as a separate device that is coupled to the networks 2, 6. The control point 16*a*, 16*b* may comprise a personal computer including a program or a dedicated hardware device. FIG. 4 illustrates an embodiment of a control point 16 including an access list 50 identifying media servers 12*a*, 12*b*, 12*c*, 12*d* whose media content is made available; an aggregate content directory 52 providing a listing of all media content in discovered media servers 12*a*, 12*b*, 12*c*, 12*d* that are indicated in the access list 50; and a user interface 54 that enables a user to configure the control points 16 and control the transfer of content media in one media server 12*a*, 12*b*, 12*c*, 12*d* to the media renderers 14*a*, 14*b*, 14*c*, 14*d*. The access list 50 may also indicate the network address of the media server 12*a*, 12*b*, 12*c*, 12*d*. The aggregate content directory 52 may include information from the content directories 30 of the media servers 12*a*, 12*b*, 12*c*, 12*d* identified in the access list 50. The control point code 56 includes the code that is executed to perform the control point operations. The code 56 may be implemented in hardware or in a computer readable medium executed by a programmable processor. In FIG. 1, the control points 16*a*, 16*b* are shown as separate hardware devices from the media servers 12*a*, 12*b*, 12*c*, 12*d* and media renderers 14*a*, 14*b*, 14*c*, 14*d*. In an alternative embodiment, the operations of the control points 16*a*, 16*b* may be integrated with a media server or media renderer device. Moreover, a device may comprise both a media renderer and media server functionality.

FIG. 5 illustrates an embodiment of operations implemented in the control point code 56 to transfer digital media from media servers to media renderers. As part of operations (at block 100) to transfer digital media in the network, comprising networks 2, 6, 10, the control points 16*a*, 16*b* communicate (at block 102) with at least one remote network 2, 6 over the interconnecting network 10. The control points 16*a*, 16*b* discover (at block 104) available devices in a local network and may discover one or more remote networks having devices capable of being controlled, such as media renderers and media servers. The control point 16*a*, 16*b* may discover devices by broadcasting a discovery request, using a protocol such as the Simple Service Discovery Protocol (SSDP) that identifies the functional capabilities that the control point 16*a*, 16*b* wants to control. Devices that support the identified capabilities respond to the request by identifying themselves to the broadcasting control point. In certain situations, the control points 16*a*, 16*b* may not discover a remote network having media servers to access.

The control point 16*a*, 16*b* authenticates (at block 106) each discovered media server 12*a*, 12*b*, 12*c*, 12*d* located in a remote network. (To control point 16*a*, network 6 is remote, and to control point 16*b*, network 2 is remote). The control point 16*a*, 16*b* may further enable (at block 108) the user to maintain an access list 50 indicating network addresses of a subset of media servers in the local network and authenticated media servers in a remote network. The access list 50 may indicate network addresses of a subset of media servers 12*a*, 12*b*, 12*c*, 12*d* available in the networks 2 and 6. The access list 50 may identify media servers 12*a*, 12*b*, 12*c*, 12*d* that the user of the control point selected to add to the access list using the user interface 54 so that only media content from the media servers indicated in the access list 50 is made available. The control points 16*a*, 16*b* discover (at block 112) media content from the media servers 12*a*, 12*b*, 12*c*, 12*d* indicated in the access list 50. Media content is only discovered from media servers in a remote network that successfully authenticated at block 108. The discovered media content from multiple media servers is indicated (at block 114) in one aggregate content directory 52 of media content.

The control points 16*a*, 16*b* enable (at block 116) discovered media renderers 14*a*, 14*b*, 14*c*, 14*d* to access media content indicated in the aggregate content directory. As discussed, the control points 16*a*, 16*b*, in response to user requests through the user interface 54 (FIG. 4), may transfer selected media content in one media server 12*a*, 12*b*, 12*c*, 12*d* to one user selected media renderer 14*a*, 14*b*, 14*c*, 14*d*. The media renderer 14*a*, 14*b*, 14*c*, 14*d* receiving media content would then render, e.g., play, reproduce in an observable medium, etc., the media content. The media servers 12*a*, 12*b*, 12*c*, 12*d* may directly transfer media content to the media renderers 14*a*, 14*b*, 14*c*, 14*d* out-of-band with respect to the band in which the control points 16*a*, 16*b* communicate with the media servers 12*a*, 12*b*, 12*c*, 12*d* and media renderers 14*a*, 14*b*, 14*c*, 14*d*.

Figure 6:
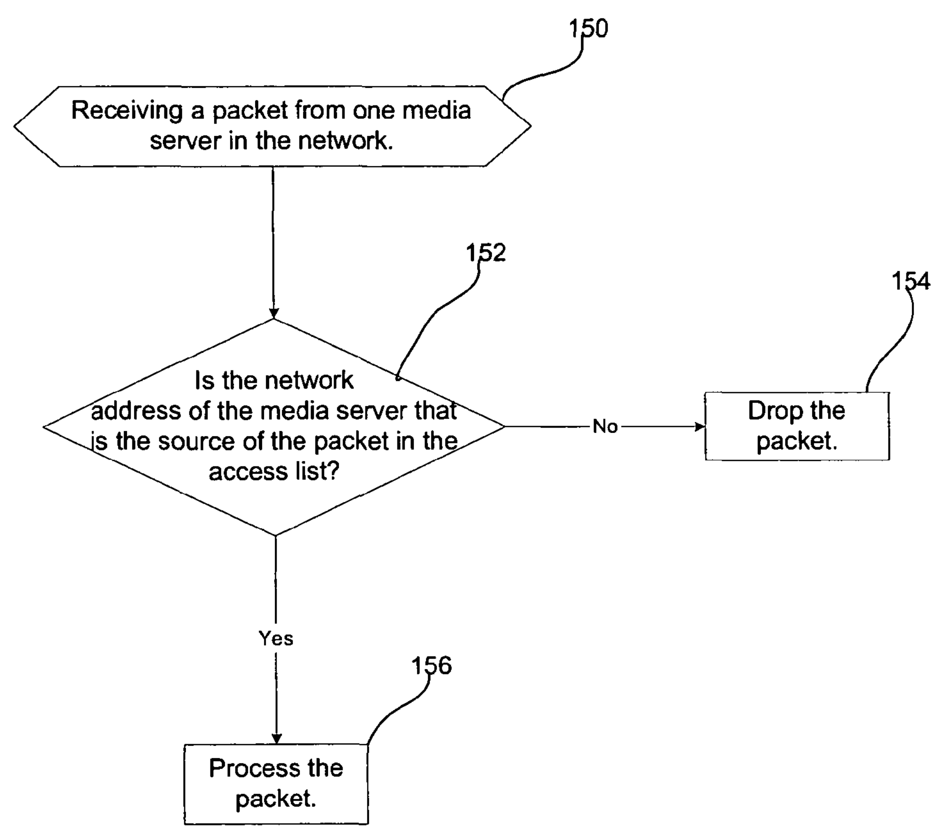

FIG. 6 illustrates an embodiment of operations implemented in the control point 16*a*, 16*b* code to process packets received from a media server 12*a*, 12*b*, 12*c*, 12*d*. In response to receiving (at block 150) a packet from one media server 12*a*, 12*b*, 12*c*, 12*d*, the control point 16*a*, 16*b* determines (at block 152) whether the network address of the media server 12*a*, 12*b*, 12*c*, 12*d* that is a source of the packet is in the access list 50. If not, the packet is dropped (at block 154). If so, the packet is processed and handled (at block 156) as requested.

Figure 7:
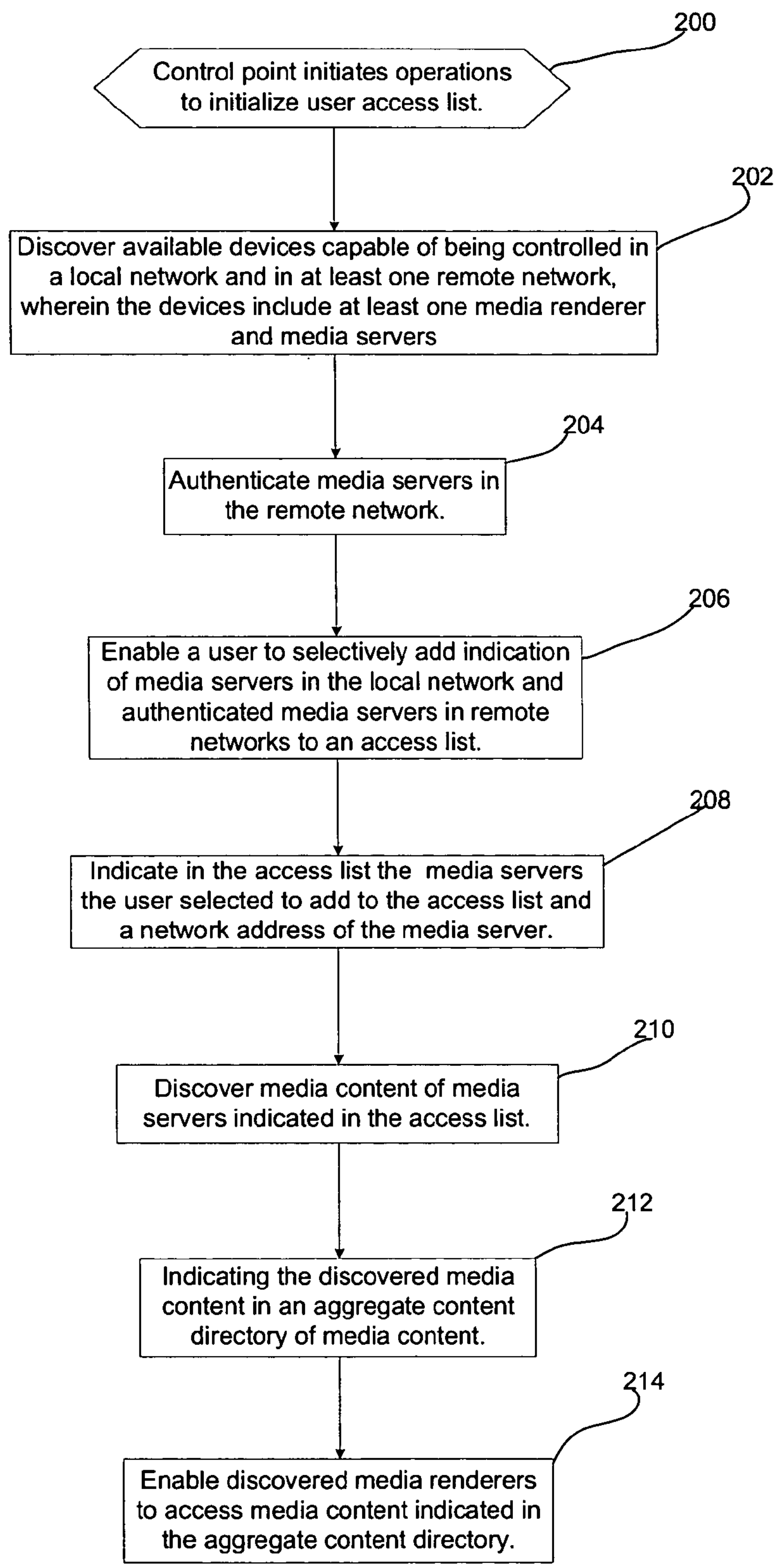

FIG. 7 illustrates an embodiment of operations implemented in the control point 16*a*, 16*b* code to allow a user to specify media servers 12*a*, 12*b*, 12*c*, 12*d* to include in the access list 50. Upon the control point 16*a*, 16*b* initiating (at block 200) operations to initialize or update the user access list 50, the control point 16*a* discovers (at block 202) devices capable of being controlled in a local network and in at least one remote network, wherein the devices include at least one media renderer and media servers. In certain situations, there may be no remote networks having devices to discover. The control point 16*a*, 16*b* authenticates (at block 204) the media servers in the remote network, e.g., media servers 12*c*, 12*d* in remote network 6. The control point 16*a*, 16*b* user interface 54 enables (at block 206) a user to selectively add indication of media servers in the local network, e.g., 2 and authenticated media servers in the remote network 6 to the access list 50. The control point 16*a*, 16*b* indicates (at block 208) in the access list 50 the media servers the user selected to add to the access list 50 and a network address of the added media server. The control point 16*a*, 16*b* then discovers (at block 210) media content in media servers indicated in the access list 50 and indicates (at block 212) the discovered media content in an aggregate content directory 52 of media content distributed in different networks 2, 6. The control point 16*a*, 16*b* enables (at block 214) discovered media renderers to access media content indicated in the aggregate content directory 52.

With the described embodiments, a control point may allow media renderers to access media content in media servers in remote networks that are identified in an access list. For instance, a user of a home network may update the access list maintained by the control point for the home network to identify media servers in remote home networks of friends or family to allow the sharing of media content. This allows a family to share home videos and pictures, as well as other media content, with friends and relatives. Additionally, the media servers in a remote network may be of a commercial nature and require payment of a fee to access the content therein.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, a control point, media servers and media renderers communicated using the UPnP protocol. In alternative embodiments, alternative protocols may be used to allow the media content from media servers to be available to media renders in a same local network and in remote networks.

The illustrated operations of FIGS. 5, 6, and 7 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method implemented in a control point in a local network, comprising:

discovering available devices in the local network and at least one remote network capable of being controlled in response to initiating, by the control point, an operation to initialize or update an access list, wherein the devices include at least one media renderer and media servers, wherein the devices are discovered in the local and the at least one remote network by broadcasting a discovery request using one protocol providing the discovery request;

authenticating each discovered media server in the at least one remote network;

indicating in the access list network addresses of a subset of the discovered media servers in the local network and the at least one remote network, including at least one authenticated media server in the at least one remote network;

determining media servers from the discovered media servers having network addresses indicated in the access list;

discovering media content in the determined media servers, wherein a Universal Plug and Play (UPnP) protocol is implemented in the determined media servers in the local and the at least one remote network and wherein the UPnP protocol is used to communicate and access the media content in the determined media servers in the local and the at least one remote network;

indicating the discovered media content from the determined media servers into an aggregate content directory of the media content, wherein the media content is discovered and presented in the aggregate content directory from the media servers in the at least one remote network that were authenticated;

enabling the discovered media renderers to access the media content indicated in the aggregate content directory; and selecting a transfer protocol and data format to use to transfer the media content from the media servers to the media renderers.

2. The method of claim 1, wherein the aggregate content directory is capable of identifying media content from media servers in different local networks, and wherein a media renderer in a first local network is capable of accessing media content in one media server in a second local network.

3. The method of claim 1, wherein the local network and at least one of the remote networks are located in different homes.

4. The method of claim 1, further comprising:

receiving a packet from one media server in the network;

determining whether the network address of the media server from which the packet is received is in the access list; and dropping the packet in response to determining that the network address of the media server is not in the access list.

5. The method of claim 1, wherein the protocol providing the discovery request comprises Simple Service Discovery Protocol (SSDP).

6. A method implemented in a control point in a local network comprising:

discovering available devices capable of being controlled in the local network and in at least one remote network in response to initiating, by the control point, an operation to initialize or update an access list, wherein the devices include at least one media renderer and media servers, wherein the devices are discovered in the local and the at least one remote network by broadcasting a discovery request using one protocol providing the discovery request;

authenticating the discovered media servers in the at least one remote network;

enabling a user to select to add the discovered media servers to an access list;

indicating in the access list the media servers the user selected to add to the access list and a network address of the media server, wherein the access list indicates media servers and their network addresses in the local network and the at least one remote network, including at least one authenticated media server in the at least one remote network;

discovering media content of the media servers indicated in the access list, wherein a Universal Plug and Play (UPnP) protocol is implemented in the determined media servers in the local and the at least one remote network and wherein the UPnP protocol is used to communicate and access the media content in the determined media servers in the local and the at least one remote network;

indicating the discovered media content in an aggregate content directory of the media content, wherein the media content is discovered and presented in the aggregate content directory from authenticated media servers in the at least one remote network;

enabling the discovered media renderers to access the media content indicated in the aggregate content directory; and selecting a transfer protocol and data format to use to transfer the media content from the media servers to the media renderers.

7. The method of claim 6, wherein the user is enabled to add one media server in one remote network to the access list in response to authenticating the media server.

8. The method of claim 6, wherein the local network and at least one of the remote networks are located in different homes.

9. A system in a local network and in communication with at least one remote network capable of having devices including at least one media renderer and at least one media server, comprising:

a memory device;

circuitry coupled to the memory device and enabled to cause operations to be performed, the operations comprising:

discovering available devices in the local network and the at least one remote network capable of being controlled in response to initiating, by the system, an operation to initialize or update an access list, wherein the devices include at least one media renderer and media servers, wherein the devices are discovered in the local and the at least one remote network by broadcasting a discovery request using one protocol providing the discovery request;

authenticating the discovered media servers in the at least one remote network;

indicating in the access list in the memory device network addresses of a subset of the discovered media servers in the local network and the at least one remote network, including at least one authenticated media server in the at least one remote network;

determining media servers from the discovered media servers having network addresses indicated in the access list;

discovering media content in the determined media servers, wherein a Universal Plug and Play (UPnP) protocol is implemented in the determined media servers in the local and the at least one remote network and wherein the UPnP protocol is used to communicate and access the media content in the determined media servers in the local and the at least one remote network;

indicating the discovered media content from the determined media servers into an aggregate content directory of the media content, wherein the media content is discovered and presented in the aggregate content directory from the determined media servers in the at least one remote network that were authenticated;

enabling the discovered media renderers to access the media content indicated in the aggregate content directory; and selecting a transfer protocol and data format to use to transfer the media content from the media servers to the media renderers.

10. The system of claim 9, wherein the aggregate content directory is capable of identifying media content from media servers in different local networks, and wherein a media renderer in a first local network is capable of accessing media content in one media server in a second local network.

11. The system of claim 9, wherein the local network and at least one of the remote networks are located in different homes.

12. The system of claim 9, wherein the operations further comprise:

receiving a packet from one media server in the network;

determining whether the network address of the media server from which the packet is received is in the access list; and dropping the packet in response to determining that the network address of the media server is not in the access list.

13. The system of claim 9, wherein the protocol providing the discovery request comprises Simple Service Discovery Protocol (SSDP).

14. A system in a local network and in communication with at least one remote network, wherein the networks are capable of having devices including at least one media renderer and at least one media server, comprising:

a memory device;

circuitry coupled to the memory device and enabled to cause operations to be performed, the operations comprising:

discovering available devices capable of being controlled in the local network and in the at least one remote network in response to initiating, by the system, an operation to initialize or update an access list, wherein the devices include at least one media renderer and media servers, wherein the devices are discovered in the local and the at least one remote network by broadcasting a discovery request using one protocol providing the discovery request;

authenticating the discovered media servers in the at least one remote network;

enabling a user to select to add the discovered media servers to an access list;

indicating in the access list the media servers the user selected to add to the access list and a network address of the media server, wherein the access list indicates media servers and their network addresses in the local network and the at least one remote network, including at least one authenticated media server in the at least one remote network;

discovering media content of the media servers indicated in the access list, wherein a Universal Plug and Play (UPnP) protocol is implemented in the determined media servers in the local and the at least one remote network and wherein the UPnP protocol is used to communicate and access the media content in the determined media servers in the local and the at least one remote network;

indicating the discovered media content in an aggregate content directory of media content, wherein media content is discovered and presented in the aggregate content directory from authenticated media servers in the at least one remote network;

enabling discovered media renderers to access media content indicated in the aggregate content directory; and selecting a transfer protocol and data format to use to transfer the media content from the media servers to the media renderers.

15. The system of claim 14, wherein the user is enabled to add one media server in one remote network to the access list in response to authenticating the media server.

16. The system of claim 14, wherein the local network and at least one of the remote networks are located in different homes.

17. A system in a local network and in communication with at least one remote network capable of having devices including at least one media renderer and at least one media server, wherein the system is implemented in a device separate from the media renderers and media servers, comprising;

a memory device;

circuitry coupled to the memory device and enabled to cause operations to be performed, the operations comprising:

discovering available devices in the local network and the at least one remote network capable of being controlled in response to initiating, by the system, an operation to initialize or update an access list, wherein the devices include at least one media renderer and media servers, wherein the devices are discovered in the local and the at least one remote network by broadcasting a discovery request using one protocol providing the discovery request;

authenticating the discovered media servers in the at least one remote network;

indicating in the access list in the memory device network addresses of a subset of the discovered media servers in the local network and the at least one remote network, including at least one authenticated media server in the at least one remote network;

determining media servers from the discovered media servers having network addresses indicated in the access list;

discovering media content in the determined media servers, wherein a Universal Plug and Play (UPnP) protocol is implemented in the determined media servers in the local and the at least one remote network and wherein the UPnP protocol is used to communicate and access the media content in the determined media servers in the local and the at least one remote network;

indicating the discovered media content from the media servers into an aggregate content directory of the media content, wherein the media content is discovered and presented in the aggregate content directory from the determined media servers in the at least one remote network that were authenticated;

enabling discovered media renderers to access the media content indicated in the aggregate content directory; and selecting a transfer protocol and data format to use to transfer the media content from the media servers to the media renderers.

18. The system of claim 17, wherein the aggregate content directory is capable of identifying media content from media servers in different local networks, and wherein a media renderer in a first local network is capable of accessing media content in one media server in a second local network.

19. An article of manufacture comprising a computer readable storage device having code executed to implement a control point in a local network and in communication with at least one remote network, wherein the networks have devices including at least one media renderer and at least one media server, wherein the control point causes operations to be performed, the operations comprising:

discovering available devices in the local and remote networks capable of being controlled in response to initiating, by the control point, an operation to initialize or update an access list, wherein the devices include at least one media renderer and media servers, wherein the devices are discovered in the local and the at least one remote network by broadcasting a discovery request using one protocol providing the discovery request;

authenticating the discovered media servers in the at least one remote network;

indicating in the access list network addresses of a subset of the discovered media servers available in the network in the local network and the at least one remote network, including at least one authenticated media server in the at least one remote network;

determining media servers from the discovered media servers having network addresses indicated in the access list;

discovering media content in the determined media servers, wherein a Universal Plug and Play (UPnP) protocol is implemented in the determined media servers in the local and the at least one remote network and wherein the UPnP protocol is used to communicate and access the media content in the determined media servers in the local and the at least one remote network;

indicating the discovered media content from the determined media servers into the aggregate content directory of the media content, wherein the media content is discovered and presented in the aggregate content directory from the determined media servers in the at least one remote network that were authenticated;

enabling the discovered media renderers to access the media content indicated in the aggregate content directory; and selecting a transfer protocol and data format to use to transfer the media content from the media servers to the media renderers.

20. The article of manufacture of claim 19, wherein the aggregate content directory is capable of identifying media content from media servers in different local networks, and wherein a media renderer in a first local network is capable of accessing media content in one media server in a second local network.

21. The article of manufacture of claim 19, wherein the local network and at least one of the remote networks are located in different homes.

22. The article of manufacture of claim 19, wherein the operations further comprise:

receiving a packet from one media server in the network;

determining whether the network address of the media server from which the packet is received is in the access list; and dropping the packet in response to determining that the network address of the media server is not in the access list.

23. The article of manufacture of claim 19, wherein the protocol providing the discovery request comprises Simple Service Discovery Protocol (SSDP).

24. An article of manufacture comprising a computer readable storage device having code executed to implement a control point in a local network and in communication with at least one remote network, wherein the networks are capable of having devices including at least one media renderer and at least one media server, wherein the control point causes operations to be performed, the operations comprising:

discovering available devices capable of being controlled in the local network and in the at least one remote network in response to initiating, by the control point, an operation to initialize or update an access list, wherein the devices include at least one media renderer and media servers, wherein the devices are discovered in the local and the at least one remote network by broadcasting a discovery request using one protocol providing the discovery request;

authenticating the discovered media servers in the at least one remote network;

enabling a user to select to add the discovered media servers to an access list;

indicating in the access list the media servers the user selected to add to the access list and a network address of the media server, wherein the access list indicates media servers and their network addresses in the local network and the at least one remote network, including at least one authenticated media server in the at least one remote network;

discovering media content of the media servers indicated in the access list, wherein a Universal Plug and Play (UPnP) protocol is implemented in the determined media servers in the local and the at least one remote network and wherein the UPnP protocol is used to communicate and access the media content in the determined media servers in the local and the at least one remote network;

indicating the discovered media content in an aggregate content directory of the media content, wherein the media content is discovered and presented in the aggregate content directory from authenticated media servers in the at least one remote network;

enabling the discovered media renderers to access the media content indicated in the aggregate content directory; and selecting a transfer protocol and data format to use to transfer the media content from the media servers to the media renderers.

25. The article of manufacture of claim 24, wherein the user is enabled to add one media server in one remote network to the access list in response to authenticating the media server.

26. The article of manufacture of claim 24, wherein the local network and at least one of the remote networks are located in different homes.

* * * * *